Nov. 1, 1932. R. G. MARTER 1,885,850
STRAINER
Filed April 20, 1931  2 Sheets-Sheet 1

Inventor
R. G. Marter.
By Young & Young
Attorneys

Nov. 1, 1932. R. G. MARTER 1,885,850
STRAINER
Filed April 20, 1931 2 Sheets-Sheet 2

Patented Nov. 1, 1932

1,885,850

UNITED STATES PATENT OFFICE

RICHARD G. MARTER, OF MILWAUKEE, WISCONSIN, ASSIGNOR TO NATIONAL ENAMELING & STAMPING COMPANY, OF MILWAUKEE, WISCONSIN

STRAINER

Application filed April 20, 1931. Serial No. 531,318.

This invention pertains to strainers, and while the same is applicable to many uses, it is particularly designed for straining milk.

In strainers of the foregoing character, it is customary to provide a funnel with a perforated bottom upon which a strainer cloth of felt or other suitable material is held by a perforated retaining disc. Screens have been employed, but these are impractical, due to the fact that they lack durability and soon become distorted. In instances where perforated plates are employed, it often occurs that the retaining disc is so positioned as to cut off the openings in the bottom of the funnel or hopper, which results in materially retarding the flow of liquid.

It is, therefore, primarily the object of the present invention to provide a strainer of the foregoing character, in which the perforations in the retaining plate and strainer bottom are so spaced and proportioned as to insure a substantially uniform area of opening, regardless of the relative position of the two, thus obtaining a predetermined flow of liquid at all times.

Incidental to the foregoing, a more specific object of the invention resides in the provision of a strainer including a pair of round perforated plates superimposed upon each other, one of said plates having elongated arcuate perforations, and the other of said plates having evenly spaced perforations of smaller area and in circumferential alignment with the perforations on the first mentioned plate, to provide a substantially uniform area of opening through the two, irrespective of their relative positions.

A more specific object resides in forming the elongated openings in one of the members in a plurality of circumferential groups or series, the openings of the inwardly successive rows in each series being reduced in length, while the openings in the other of said members are substantially uniform and of less area.

In addition to the foregoing, a still further object resides in forming perforations in both members of the strainer in radial disalignment and of substantially uniform circumferential spacing to provide an approximately uniform amount of stock throughout any radial cross section to prevent uneven weakening of the material with resultant warping or breakage.

With the above and other objects in view, which will appear as the description proceeds, the invention resides in the novel construction, combination and arrangements of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings, Figure 1 is a vertical section taken through a strainer constructed in accordance with the present invention;

Figure 1:
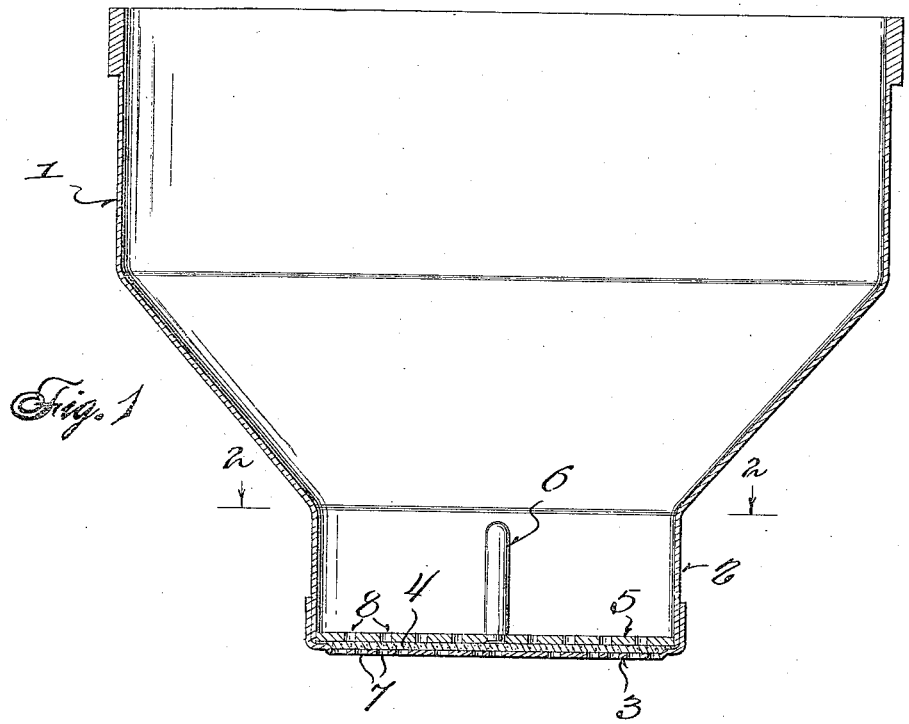
Figure 2:
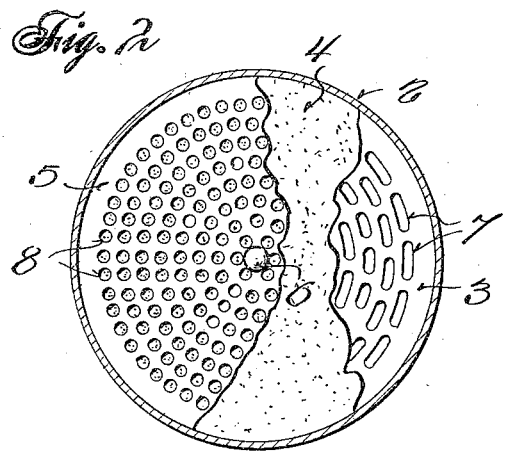
Figure 2 is a plan section taken on the line 2—2 of Figure 1, parts being broken away to more clearly illustrate structural features.

Referring now more particularly to the accompanying drawings, the numeral 1 designates a funnel provided with an annular restricted lower portion 2 having secured thereto in any suitable manner a perforated bottom plate 3. In practice, a strainer pad 4 of cloth, felt, paper, or other suitable material, is positioned on the bottom plate 3, and held thereon by a perforated retainer plate 5, which for the convenience of manipulation is provided with a suitable handle 6. Obviously, the retainer plate 5 serves to effectively hold the strainer cloth 4 in intimate contact with the perforated bottom plate 3, thus insuring all of the liquid passing through the strainer cloth.

As explained in the preceding objects difficulty has been encountered heretofore in obtaining a predetermined uniform flow of liquid through conventional strainers, due to the fact that unless extreme care was employed in properly positioning the retainer plate with relation to the bottom strainer plate, the perforations or openings in the strainer plate would be cut off, thus retarding the flow.

To overcome the foregoing, the present invention provides for a novel formation and arrangement of openings in the strainer and retaining plates to provide for uniform flow of liquid therethrough, regardless of the relative position of the plates.

Figure 4:
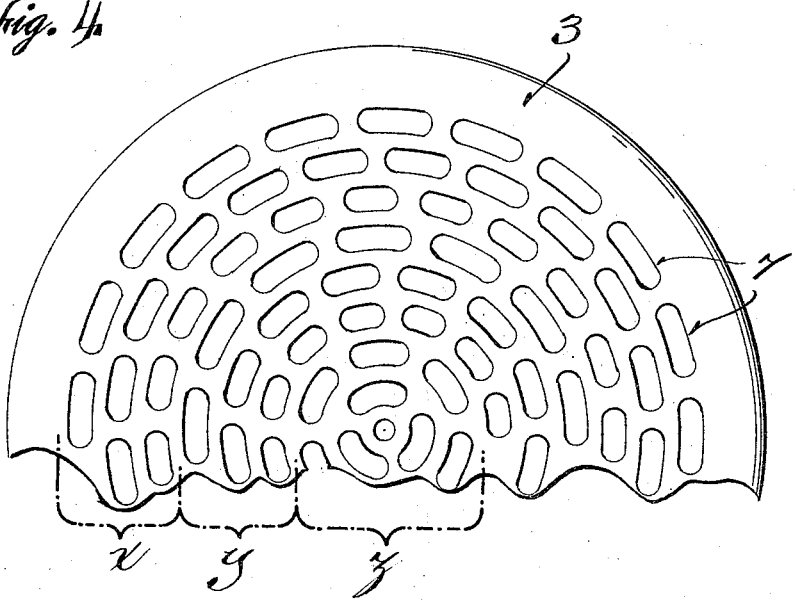
Figure 4 is a fragmentary detail of the perforated bottom plate of the funnel.

To accomplish this, the perforations 7 provided in the bottom plate 3 are circumferentially elongated and aligned in spaced rows, as best shown in Figure 4. It will also be noted that a plurality of groups or series of rows are provided which are designated on Figure 4 as "x" and "y". In the present instance, each group comprises three circumferential rows of openings, each successive inward row of openings of a series being gradually reduced in length to provide a uniform number of connecting webs between the perforations. At the same time it will be noted that the openings of each row are radially disaligned, thus providing for an approximate uniform amount of stock on any radial cross section.

The purpose of grouping the openings in rows gradually reduced in length is to maintain the elongated formation of the openings throughout the radius of the plate, it being otherwise obvious that were the rows of openings to be successively reduced in length, toward the center of the plate, those approximate the center would have to be restricted to such extent as to be of approximately the area of the openings in the retainer plate, which would defeat the purpose of the invention.

In the exemplification of the invention illustrated, a third series or group "z" of perforations is provided adjacent the center of the plate, which are of substantially uniform elongation, the inner row being provided with fewer perforations than the outer row of the group in order to prevent excessive weakening of the stock at this point.

As shown in the drawings, the retainer plate 5 is provided with a plurality of openings 8 which in the present instance are round, although the same may be of any concentric formation, such as square, hexagonal, and the like, it being understood that the perforations 8 are substantially uniform in area and spacing, the same being disaligned radially but aligned circumferentially to align with the circumferential rows of openings 7 in the bottom plate 3.

Figure 3:
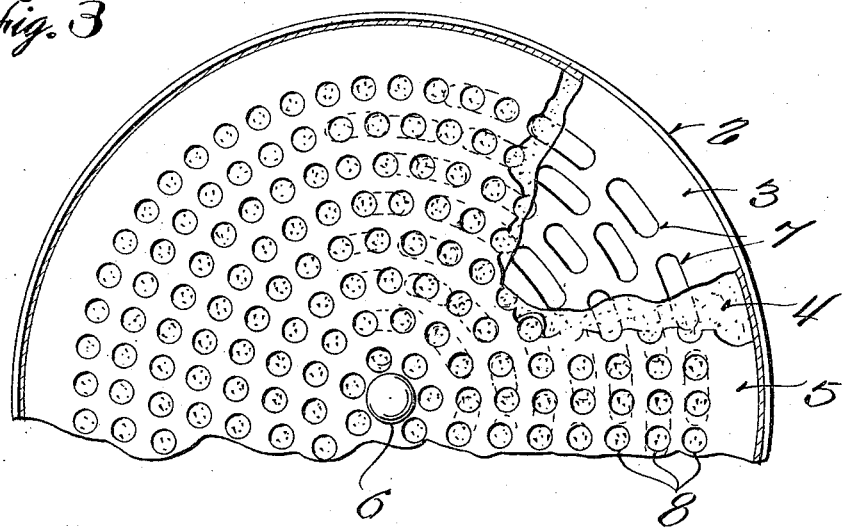
Figure 3 is an enlarged fragmentary detail of the same.

As best indicated in Figure 3, due to the circumferential elongation of the slot 7, a predetermined area of opening between the plates 3 and 5 is obtained, regardless of the relative position of the plates, thus eliminating the necessity of carefully positioning the retainer plate and insuring a uniform flow of material through the strainer at all times.

The foregoing is due to the fact that the relative proportions of the openings in the respective plates is such that while a certain portion of the elongated openings may be cut off by the connecting webs in the adjacent plate, a sufficient portion of the slots remains exposed or aligned with the openings in the adjacent plate to insure a uniform predetermined flow.

From the foregoing explanation taken in connection with the accompanying drawings it is belived that the advantages of the present structure will be quite apparent, in that not only is a uniform flow of liquid through the strainer provided for, regardless of the respective positions of the perforated plates, but also the perforations are so formed and spaced as to eliminate uneven weakening of the plate, which is highly important in a device of the present character, due to the fact that the same receives exceedingly rough usage, which would otherwise cause the perforated plates to bend or warp, thus preventing the intimate contact between the plates and filter cloths, essential to the operation of a strainer of this type.

It will be further understood that while the bottom plate 3 has been shown and described as provided with the elongated perforations 7, and the upper plate with the uniform concentric openings, the same may be readily reversed without departing from the present invention, which resides entirely in the relative proportions and arrangements of the perforations in the cooperating plates.

I claim:

1. A strainer including a pair of perforated plates superimposed upon each other, the perforations of said plates being circumferentially aligned, the perforations in one of said plates being circumferentially elongated and formed in groups of circumferential rows, the openings of the inwardly successive rows of each group being gradually reduced in length, and the openings of the corresponding rows of each group being of substantially equal area.

2. A strainer including a pair of perforated plates superimposed upon each other, the perforations of said plates being circumferentially aligned, the perforations in one of said plates being circumferentially elongated and formed in groups of circumferential rows, the openings of the inwardly successive rows of each group being gradually reduced in length, and the openings of the corresponding rows of each group being of substantially equal area, said openings being radially disaligned.

3. A strainer including a pair of perforated plates superimposed upon each other, the perforations of said plates being circumferentially aligned, the perforations in one of said plates being circumferentially elongated and formed in groups of circumferential rows, the openings of the inwardly successive rows of each group being gradually reduced in length, and the openings of the corresponding rows of each group being of substantially equal area, said openings being radially disaligned, the perforations in the other of said plates being of less area than those of the first mentioned plate and aligned circumferentially therewith.

4. A strainer comprising a pair of perforated plates superimposed upon each other, the perforations of said plates being aligned circumferentially, the openings in one of said plates being elongated circumferentially to provide slots, whereby to provide a substantially uniform area of opening through the plates irrespective of the relative position of the plates.

5. A strainer comprising a pair of perforated plates superimposed upon each other, the perforations of both plates being aligned circumferentially, the perforations in one of said plates being elongated circumferentially to provide arcuate slots, and the perforations in the other of said plates being of less area than those of the other plate and of uniform area and spacing whereby to provide a substantially uniform area of opening through the plates, irrespective of the relative position of the plates.

In testimony that I claim the foregoing I have hereunto set my hand at Milwaukee, in the county of Milwaukee and State of Wisconsin.

RICHARD G. MARTER.